Nov. 20, 1962
R. B. SCOTT
3,065,331
THERMAL FORMING DEVICE
Filed Oct. 15, 1959
2 Sheets-Sheet 1
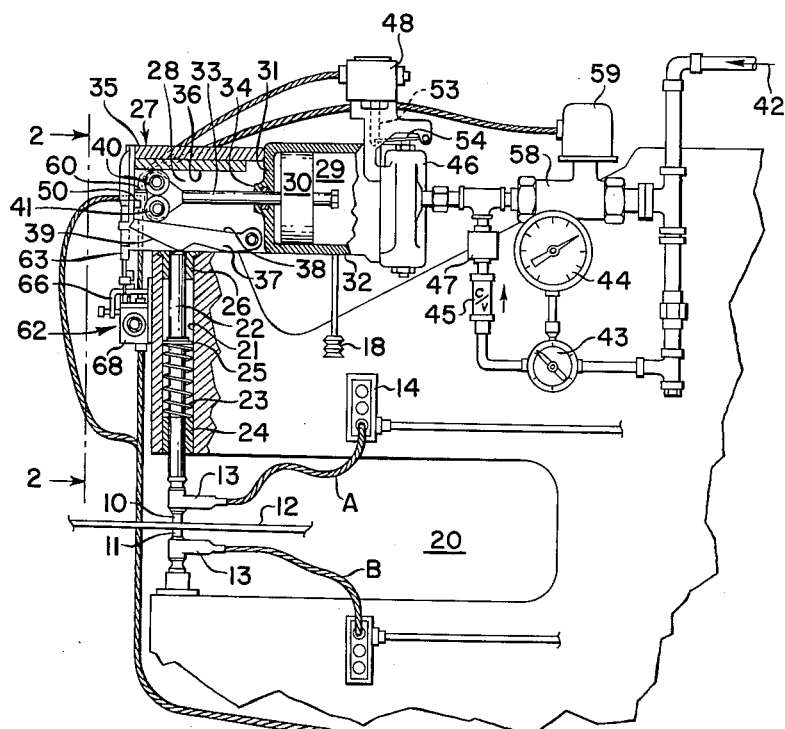
Fig-1
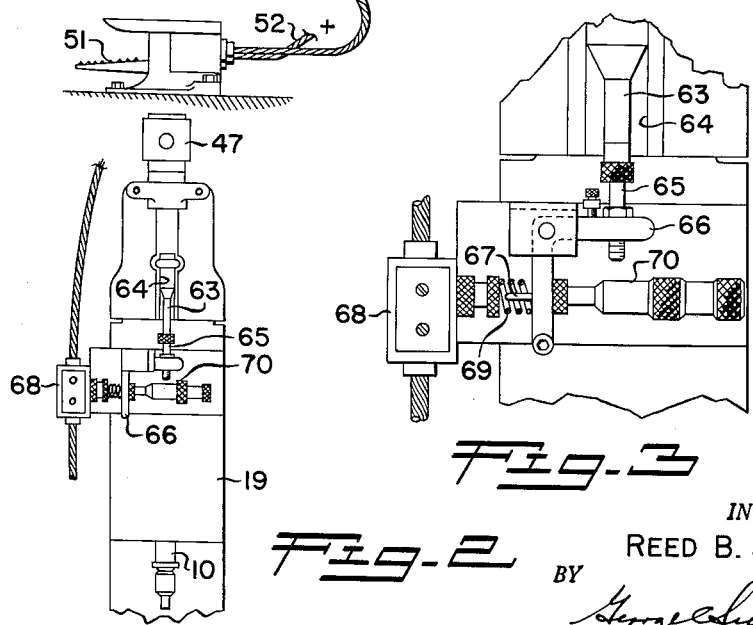
Fig-2
Fig-3
INVENTOR.
REED B. SCOTT
BY
George C. Sullivan
Agent Nov. 20, 1962  R. B. SCOTT  3,065,331
THERMAL FORMING DEVICE
Filed Oct. 15, 1959  2 Sheets-Sheet 2
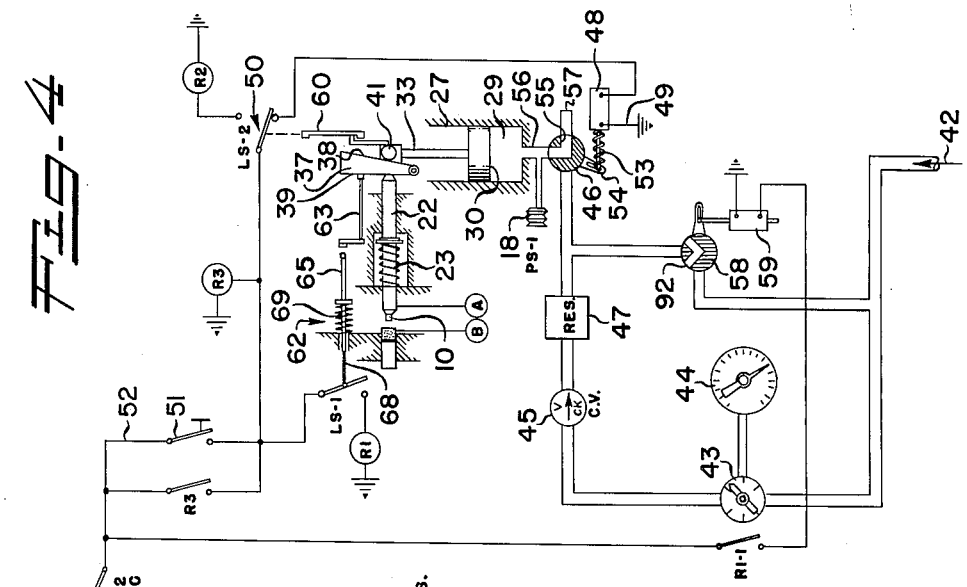
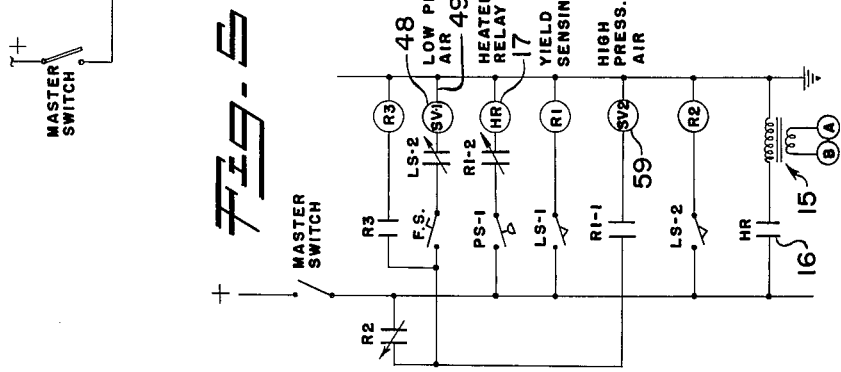
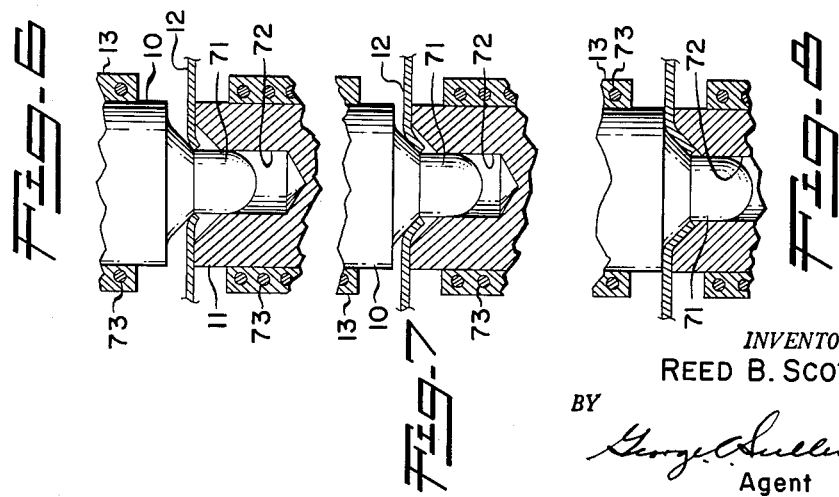
INVENTOR.
REED B. SCOTT
BY
George C. Sullivan
Agent

United States Patent Office 3,065,331
Patented Nov. 20, 1962

3,065,331
THERMAL FORMING DEVICE
Reed B. Scott, Encino, Calif., assignor to Lockheed Aircraft Corporation, Burbank, Calif.
Filed Oct. 15, 1959, Ser. No. 846,587
2 Claims. (Cl. 219—149)

This invention relates to thermal forming devices and, more particularly, to an improved thermal forming device which relies upon the thermal condition of the material being formed to control the forming operation and includes resistance heating means for thermally conditioning the material.

In the field of sheet metal forming, and other similar applications, rigid material often is formed by heating the material to a condition where it becomes pliable followed by the application of a strong force or pressure which forms the material into a desired shape. For example, in conventional dimple forming machines, forming tools are employed having affixed thereto several heating elements. Upon engagement of the tools with the material, heat generated by the elements is transferred to the material by means of the tools for a predetermined period of time usually employing conduction, induction or resistance heating techniques. This period of time is generally known as the "time setting" or "dwell period", and is determined by a timer set to take into consideration, the area being heated and the type of material used. Usually at the end of a dwell period, a timer switch is employed to cause a strong force or pressure to be applied to the forming tools which causes the material to assume the final shape of the forming tools. If additional dimples or forms are to be made, the well periods remain constant for each dimple formed, regardless of the actual material temperature. Thereby over and under heating difficulties are encountered.

In a co-pending U.S. patent application entitled "Thermal Forming Device" by inventor, Vernal Kenneth Kennedy, Serial Number 525,838, filed August 2, 1955, a device is shown and described which overcomes the difficulties existing with the above conventional thermal forming devices which are due, in part, to the fact that the strong force or high pressure is sometimes applied before the material has been adequately heated. Thereby, many prolems are inherent using the above conventional thermal forming devices which generally result in a loss of material strength due to over and/or under heating.

The device of the above referenced patent application may be referred to as employing "yield sensing techniques" employed on a dimpling machine for example which provides for heating the workpiece by conduction from heated tools. However, as long as the process was employed to form aluminum at temperatures within the range of 300° F. to 500° F., the process was tolerable. Furthermore, since conduction heating was employed, a comparatively long dwell time is required to bring the workpiece to temperature which is sometimes damaging to the metal. For example, the forming or dimpling of steels requires heating the material within the range of 1400° F. to 1800° F. and by employing conduction heating as disclosed in the co-pending application would result in annealing a large area of the workpiece, thereby reducing strength of the joint or formed area.

Because of the interest and need in fabricating heat treated steels for high speed aircraft, it is necessary to develop new methods and machines that will satisfactorily form a more difficult type workpiece of higher integrity than used on present day aircraft. Present equipment and processes employed by the aircraft industry in particular, cannot produce crack-free dimples or other forms in the higher strength heat treated steels.

The above difficulties are overcome in accordance with the present invention in which I provide a thermal forming machine comprising the yield sensing techniques employed in the above referenced co-pending application for sensing material pliability and further providing resistance heating techniques for heating the workpiece so that the material will not lose its high strength or material integrity. The present invention includes heating electrodes having the configuration of the shape desired to be placed in the material. The completing of an electrical circuit in which the electrodes are connected causes high current to flow through the workpiece and generate heat of a high temperature in the workpiece in order to make it pliable. A material sensing means is provided so that the generation of electrical current in the workpiece can be selectively initiated and terminated. A low pneumatic pressure means is employed for initiating movement of the forming tool which commences the operation cycle and the initiation of the heating current flow in the workpiece and to condition the workpiece and make it pliable. A trigger mechanism, following the movement of the forming tool, operates a valve switch means which connects a high pneumatic pressure means to augment the applied low pressure, thus further activating the forming tool. The additional pressure forces the forming tool to complete the forming operation. At a predetermined point, the electrical circuit in which the electrodes are included is broken so that the possibility of material being overheated is eliminated. It is to be understood that the pressure system employed may take a form other than pneumatic, such as, for example, a steam or hydraulic fluid system.

The action of the trigger mechanism and, therefore, the activation of the valve switch means is dependent upon the material temperature during the initial cycle of operation since as the material becomes more pliable, the forming tool is pressed further against the material. If the material has not been properly thermally conditioned, the rigidity of the material will prevent the activation of a trigger mechanism and the consequent application of high pressure. Furthermore, over and under heating is eliminated since means, associated with yield sensing portion of the invention, are provided for closing and opening the resistance heating circuit to initiate and terminate current flowing through the workpiece. Thus, it can be seen that the application of high pressure will not occur until the thermally conditioned material has become pliable due to the proper conditioning by resistance heating techniques. No loss or dissipation of heat is encountered such as is the case when heat by conduction or induction is employed.

Therefore, it is an object of the present invention to provide a device which employs resistance heating and yield sensing control of workpiece temperature to form hard alloys such as the precipitation hardening steels such as AM350, 17-7PH, etc.

Another object of the present invention is to employ yield sensing as a means of detecting and controlling a workpiece temperature to overcome the temperature variations inherent in temperature control by the employment of timing means.

Still a further object of the present invention is to provide a high strength material forming device which incorporates a heating means for very rapid heating and for localizing the heating of the workpiece to a restricted and selected area.

With the above and other objects in view, my invention consists in the arrangement, combination and details of construction disclosed in the specification and drawings in which:

FIGURE 1 is a side elevational view of a thermal forming device in accordance with the present invention, being shown partly in the fragmentary section;

FIGURE 2 is a front elevational view taken along line 2—2 of FIGURE 1, showing a trigger mechanism employed in the device of FIGURE 1;

FIGURE 3 is an enlarged front elevational view of the trigger mechanism shown in FIGURE 2;

FIGURE 4 is a schematic drawing of the device shown in FIGURE 1;

FIGURE 5 is a schematic drawing of the electrical system employed in the device of FIGURES 1 and 4;

FIGURE 6 is an enlarged sectional view showing the forming tools employed in the device of FIGURE 1 initially shaping material to form a dimple in a workpiece;

FIGURE 7 is an enlarged sectional view showing the forming tools employed in the device of FIGURE 1 having formed the work piece approximately 85% of the desired shape; and FIGURE 8 is an enlarged sectional view showing the forming tools employed in the device of FIGURE 1 completing the shape of the workpiece and the forming operation.

Referring to FIGURE 1 and FIGURE 4, a pair of forming tool means 10 and 11 are provided for shaping a sheet of rigid material 12. The forming tool means are configured in such a manner that their co-action when activated produces a desired shape in the material. The present invention is shown in the form of a dimpling machine for producing a drawn depression in a high strength metal sheet 12 for receiving a flush-type rivet or fastener. The depression produced is more economical than countersinking and stronger since no metal is removed.

A resistance heating arrangement including electrodes 13 coupled to the tool forming means is employed for thermally conditioning the material, particularly the precise area where a dimple is to be formed. The technique employed to permit crack-free dimpling or forming of hard alloy material is to pass a heavy current of low voltage between the forming tools and through the material. The resultant material temperature, through below critical annealing temperature, permits increased elongation before rupture. For illustration, a step-down transformer 15 as shown in FIGURE 5 for generating the high amperage current which is energized by the closing of contacts 16 of a heater relay 17.

The heating electrodes are electrically connected to boxes such as junction box 14 by means of connector leads A and B. An electrical high amperage source (not shown), such as a transformer or spot welding generator is connected to the junction boxes which provides the required high current for generating heat to the material.

The forming tool means are associated with a base assembly 19 having an open cut-out portion represented by the numeral 20. The forming tool means are located within the open cut-out portions so that the material 12 may be passed into engagement therewith.

An annular passage 21 is provided in the base assembly extending from the top thereof to the open cut-out portion. A shaft portion 22 of the forming tool means 10 passes through the annular passage and is resiliently mounted therein by means of a spring 23 compressed between a bushing 24 affixed to the base assembly and a retaining ring 25 affixed to the shaft portion. A top bushing 26, affixed to the top portion of the annular passage coacts with bushing 24 to guide the shaft portion perpendicularly to the material 12.

Forming tool means 10 may be moved longitudinally within the annular passage to effect engagement with the material by any conventional means. A cylinder 27, having a pair of operating chambers 28 and 29, and a piston 30 operating within chamber 29 is employed in the device of FIGURE 1 which is suitable for activating the forming tool means. The operating chambers are separated by a casing wall 31 of a casing 32 which forms operating chamber 29. The piston located in operating chamber 29 is attached to an extension arm 33 which passes through the casing wall into the operating chamber 28 via a sleeve 34.

Operating chamber 28 is formed by an outer casing 35 which has attached thereto a flat top cam means 36. Annular passage 21 extends through the base assembly to operating chamber 28. A lower cam means 37 is pivotally mounted within operating chamber 28 which is provided with a flat cam surface 38 and an annular cam surface 39 which is engageable with the shaft portion of the forming tool means.

Affixed to extension arm 33 within operating chamber 28 is a pair of rollers 40 and 41 arranged to ride on the top cam means and the flat cam surface, respectively. Piston movement is rectilinear to the flat top cam means 36. Progression of piston 30 forces the lower cam means to pivot. Inasmuch as annular cam surface 39 is in engagement with the shaft portion, any pivotal movement of lower cam means 37 positions the shaft portion longitudinally in the annular passage and thereby positions forming tool means 10 in a perpendicular relationship to the material.

Piston movement is effected by employment of pressure systems such as a pneumatic pressure system, for example. High pneumatic pressure is introduced from any suitable source (not shown) through a system network represented by an arrow 42.

The pneumatic system comprises a local pneumatic pressure regulator means 43 having a gage 44 for indicating the pneumatic pressure applied to the subsequent system. A check valve 45 is coupled to the low pneumatic pressure means through which the low pressure passes. The check valve serves to maintain the pneumatic pressure flow with as little fluctuation as possible. A low pressure valve 46 is connected to the check valve via a pneumatic reservoir 47. The low pressure valve is electrically operated by means of a solenoid 48. The solenoid is connected to ground via lead 49 and connected to a positive source of potential via a switch 50, a foot pedal switch means 51, and a lead 52 and a relay coil R2 which operates through contact LS-2 of switch 50.

A rod 53, composed of magnetizable material, is arranged to form a movable core within the solenoid 48 so that when the solenoid 48 is energized the rod will move. Attached to the rod on one end is a pivotal extension 54 which is attached to the low pressure valve and movable therewith. The low pressure valve is provided with passage 55 extending therethrough and forming a right angle within the center of the low pressure valve.

The piston 30 is activated by energizing solenoid 48 which arranges passage 55 so that pneumatic pressure is applied through a coupling arrangement 56 extending through casing 32 into operating chamber 29. Passage 55 is further arranged to exhaust pneumatic pressure within operating chamber 29 by connecting the coupling arrangement to an exhaust outlet 57 whenever solenoid 48 is deenergized. Disposing of accumulated pressure allows the piston to return to its rest position.

Arranged between valve 46 and the piston, is a pressure switch 18 for operating an electrical contact PS-1 when the low pressure build-up in the cylinder for actuating the piston reaches a pre-determined level. Actuation of pressure switch contact PS-1 couples the electrical circuit to the heater relay so that its associated contact 16 will close to provide electrical energy to the transformer 15 so that high current will flow in the resistance heating electrical arrangement.

A probe 60 is provided on the end of the extension arm 33 which passes through the outer casing at the end of a piston stroke. The probe is employed for tripping contact LS-2 of switch 50 which in turn breaks electrical contact to solenoid 48 and causes its de-energization. Contact LS-2 also completes an electrical circuit with relay R2 so that current to the relay R3 is broken, thereby, releasing contact R3 and readying the foot switch for another operational cycle.

A trigger mechanism, represented by the numeral 62, is mounted on the front of the base assembly adjacent the shaft portion and is shown more clearly in the FIGURE 2 and FIGURE 3. The trigger mechanism is employed for controlling the operation of a solenoid 59 and comprises a plunger 63 slidably mounted in a groove 64 and engageable with a set screw 65.

One end of the lower cam means extends beyond the outer casing to engage plunger 63. The plunger is moved longitudinally in groove 64 by the pivotal action of the lower cam means. In this manner, the movement of the plunger follows the movement of forming tool means 10.

A bell-crank 66, affixed to set screw 65, pivots when the set screw is arranged by the plunger so that its movement is transferred via a push rod 67 to actuate a contact LS-1 of a switch 68 which controls the energization of a relay R1 so that closure of its contact R1-1 energizes high pressure valve solenoid 59. Relay R1 has another contact R1-2 which is normally closed so that upon energization of relay R1, contact R1-2 will open to de-energize the heater relay and open its contact 16 to break the electrical circuit to transformer 15. A spring 69 is provided for returning the bell-crank and the plunger to their initial positions. An adjustable micrometer 70 mounted on the base assembly is employed for manually controlling the point at which the switch 68 is tripped prior to operation.

FIGURE 5 illustrates a schematic diagram of the electrical circuit employed in the device of FIGURES 1 and 4. To initiate a forming cycle, the master switch is closed and the foot switch 51 is closed which, via normally closed contact LS-2, energizes solenoid 48 to apply low pressure air to the actuating cylinder to clamp the material 12 between the tool forming means 10 and 11. Relay R3 is also energized which locks in the solenoid via contact R3 so that the foot switch may be released.

The heating period commences by the sensing of maximum pressure of the low pressure system at the actuating cylinder inlet port. At maximum pressure contact PS-1 closes to provide current to the heater relay 17 via normally closed contact R1-2 of relay R1. Energization of the relay 17 causes the closure of contacts 16 to supply the primary coils of transformer 15 with operating current. This causes current in the transformer secondary and supplies high amperage, low voltage current to the electrodes 13 and forming tools 10 and 11 via the leads A and B. Thus, current passing through material in the area of tool means engagement causes heating and material pliability.

As the material becomes pliable, the forming tool 10 lowers until contact LS-1 of switch 68 closes to energize relay R1 which, in turn, closes contact R1-1 to energize the high pressure solenoid 59 and opens contact R1-2 to de-energize the heater relay 17 and thereby terminate the resistance heating of the material.

To complete the forming cycle, contact LS-2 of switch 50 is adjusted to open at the end of the piston stroke by means of probe 60. The opening of LS-2 de-energizes solenoid 48 exhausting the high pressure air to the atmosphere, thereby relieving the pressure from the workpiece and returning all components to their starting positions in preparation for a new forming cycle. The opening of the circuit to the solenoid 48 by LS-2 also closes a circuit to a relay R2 which opens its normally closed contact R2 effecting the breaking of the electrical circuit to relay R3 and the high pressure solenoid 59.

In FIGURES 6-8, a simple forming tool means is shown for forming a dimple in sheet material during three stages of operation employing yield sensing techniques. The dimpling tools are used to form a countersink recess in sheet metal workpiece 12 to accommodate conical rivets and screw-heads. The improvement of the present invention provides resistance heating means for thermally conditioning the workpiece by passing a current through the area to be formed, which softens the metal, thereby preventing a radial and circumferential cracking and in addition employs means to yield sensing control temperature of the workpiece. FIGURE 6 shows the initial engagement of forming tool means 10 and 11 with the material 12 when activated by the low pressure means to form approximately 15% of the dimple. A pilot nub 71 mated with a receptacle 72 is provided as a means for guiding or piloting the forming means into proper alignment and engagement.

Heat, generated by the resistance of material 12, when pressure switch contacts PS-1 supply electrical current to the resistance heating circuit causes the material to become pliable.

In FIGURE 7, the material has been thermally conditioned to the yield point where it has become workable. The continued application of low pressure to the forming tool has effected approximately 85% of the dimple. It should be noted that the partially formed dimple has been accomplished only as the material became more and more pliable and that no portion of the material has been formed which has not been thermally prepared. It should further be appreciated that no timing mechanism is employed to determine the length of time for heating and that this function is determined solely by the pliability of the material.

FIGURE 8 shows a completed dimple formed in the material as a result of applying high pneumatic pressure when the material has been properly conidtioned. Since the application of high pressure occurs when the material is thoroughly conidtioned to be worked, the completed form or dimple is ont susceptible to cracking due to brittleness as the result of using conventional methods and apparatus.

Actual operation will be described with reference to FIGURE 4 in which the depression of foot pedal 51 completes an electrical circuit via contact LS-2 of switch 50 to energize solenoid 48. Energizing this solenoid draws rod 53 into its core (not shown) causing low pressure valve 46 to arrange passage 55 so that low pneumatic pressure flowing through low pneumatic regulator means 43 is applied to cylinder 27. The closing of foot switch 51 also energizes relay R3 which closes contact R3 permitting the foot switch to open without de-energizing valve solenoid 48. As pneumatic pressure is applied to chamber 29, piston 30 is forced to move within the cylinder. Also, pressure switch 18 through contact PS-1 causes the heater relay 17 to actuate closing contact 16 so that current can be provided to the resistance heating electrical circuit via electrodes 13. Roller 41 connected to an extension arm 43 follows the movement of the piston by riding on flat cam surface 38. This action causes cam means 37 to pivot. Inasmuch as shaft portion 22 rides against angular cam surface 39, the shaft portion is forced downward against the tension of spring 43. This action engages forming tool means 10 with the material (not shown).

Heat generated by the flow of current through the material causes the material to become more and more pliable. As the rigid material becomes pliable due to this heating, the forming tool means is lowered still further since the low pneumatic pressure is still being applied. Plunger 63 following the movement of the forming tool means eventually engages set screw 55 attached to bell-crank 63. As the plunger moves down the bell-crank pivot acts against spring 69. Push rod 67, carried by the bell-rank, engages switch 68 which closes contact LS-1 to energize relay R1 and closes contact R1-1 associated with relay R1 to energize the high pressure solenoid 59. Energizing solenoid 59 causes high pressure valve 58 to arrange its passage 92 to permit the application of high pneumatic pressure to piston 30 via low pressure valve 46.

The application of high pneumatic pressure forces the piston to complete its stroke within the cylinder and complete the forming operation. The completion of piston stroke causes probe 60 to open contact LS-2 of switch 50 which causes solenoid 48 to de-energize. This action causes passage 55 to connect cylinder 27 with exhaust outlet 57. The accumulated pneumatic pressure within cylinder 27 may escape and thereby allow the piston to return to its initial position. As the piston retreats, spring 23 forces the shaft portion upward against cam means 37 to its rest position. The actuation of contact LS-2 of switch 50 causes positive potential to be applied to relay R2 thereby causing its associated contacts R2 to open which further insures de-energization of the high pressure solenoid.

As tool means 10 and plunger 22 disengage with the workpiece and move upward as piston 30 retreats in its cylinder, contacts LS-1 is broken which causes the de-energization of relay R1 which opens its associated contact in the heater relay circuit so that the electrical energy necessary for resistance is terminated.

Sufficient pneumatic pressure is retained in the pneumatic system and reservoir 47 to permit efficient reactivation of piston movement upon another depression of the foot pedal.

Having described only typical forms of the invention I do not wish to be limited to the specific details herein set forth, but wish to reserve to myself any variations or modifications that may appear to those skilled in the art and fall within the scope of the following claims.

I claim:
1. In a thermal forming device for shaping high strength material having a certain yield point, the combination comprising, a movable forming tool, means for supporting the material and cooperating with the tool in shaping the material, an electrical resistance heating network coupled to the forming tool and the supporting means for the material for heating the material to be formed by passing a large current through the material to achieve the yield point, a low pressure means activating the tool during a first cycle of operation to initiate shaping the material, a pressure sensitive switch included in the low pressure means and connected in the electrical resistance heating network solely for initiating the heating of the material, the first cycle of operation occurring prior to the material reaching its yield point, a high pressure means for activating the tool during a second cycle of operation to complete the shape, actuation means responsive to the movement of the tool, which is determined mechanically connected with the tool at all times and responsive to tool movement so that a predetermined length of travel of the tool after initial movement from rest activates the high pressure means for the second cycle of operation, the desired thermal condition of the material determining selection of the length of tool travel so that actuation of the high pressure cycle is controlled by the condition of the material, and switch means included in the electrical resistance heating network responsive to the attainment of material yield point to disconnect the network and cease material heating.

2. The thermal forming device for shaping high strength material as set forth in claim 1 wherein the actuating means may be adjusted to permit variation in the length of predetermined travel of the tool.

References Cited in the file of this patent

UNITED STATES PATENTS

| 1,174,446 | Rietzel | Mar. 7, 1916 |
| 1,242,580 | Murray | Oct. 9, 1917 |
| 2,460,519 | Marchant | Feb. 1, 1949 |
| 2,890,324 | Havlik | June 9, 1959 |
| 2,909,651 | Cook | Oct. 20, 1959 |
| 2,956,148 | Shoebridge | Oct. 11, 1960 |

OTHER REFERENCES

"Direct Resistance Heating," Automotive and Aviation Industries, Nov. 15, 1946; pages 24-26 and 68 relied on.